(12) United States Patent
Masumiya et al.

(10) Patent No.: US 10,146,204 B2
(45) Date of Patent: Dec. 4, 2018

(54) MACHINING METHOD AND A CONTROL DEVICE FOR A MACHINE TOOL

(71) Applicant: MAKINO MILLING MACHINE CO., LTD., Tokyo (JP)

(72) Inventors: Yasunori Masumiya, Aiko-gun (JP); Kyohei Suzuki, Aiko-gun (JP); Jun Kanaya, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 181 days.

(21) Appl. No.: 15/115,546

(22) PCT Filed: Aug. 13, 2014

(86) PCT No.: PCT/JP2014/071406
§ 371 (c)(1),
(2) Date: Jul. 29, 2016

(87) PCT Pub. No.: WO2015/114861
PCT Pub. Date: Aug. 6, 2015

(65) Prior Publication Data
US 2017/0185064 A1    Jun. 29, 2017

(30) Foreign Application Priority Data
Jan. 31, 2014    (WO) .................. PCT/JP2014/052316

(51) Int. Cl.
*G06F 19/00*    (2018.01)
*G05B 19/404*    (2006.01)
(Continued)

(52) U.S. Cl.
CPC .......... *G05B 19/404* (2013.01); *G05B 19/27* (2013.01); *G05B 19/416* (2013.01); *G05B 19/195* (2013.01); *G05B 2219/37355* (2013.01); *G05B 2219/37618* (2013.01); *G05B 2219/41032* (2013.01); *G05B 2219/41079* (2013.01); *G05B 2219/41265* (2013.01)

(58) Field of Classification Search
CPC .. G05B 19/416; G05B 19/404; G05B 19/195; Y10T 82/2514
See application file for complete search history.

(56) References Cited

U.S. PATENT DOCUMENTS

2011/0044778 A1* 2/2011 Yamada ............... G05B 19/416
409/80

FOREIGN PATENT DOCUMENTS

JP    2558580    5/1994
JP    7-110717   4/1995
(Continued)

OTHER PUBLICATIONS

International Search Report and Written Opinion dated Nov. 4, 2014, directed towards International Application No. PCT/JP2014/071406; 6 pages.

*Primary Examiner* — Tuan A Vu
(74) *Attorney, Agent, or Firm* — Morrison & Foerster LLP

(57) ABSTRACT

In this machining method, in which a rotary tool is moved relative to a workpiece and/or the workpiece is moved relative to the rotary tool so as to machine a curved surface on said workpiece, rotation in the direction of said curved surface is added to the workpiece such that the positions of reversal marks left on the curved surface per tool path are dispersed in the direction of said rotation.

9 Claims, 13 Drawing Sheets

(51) Int. Cl.
  *G05B 19/416*   (2006.01)
  *G05B 19/27*    (2006.01)
  *G05B 19/19*    (2006.01)

(56) References Cited

FOREIGN PATENT DOCUMENTS

| | | |
|---|---|---|
| JP | 2004-234205 | 8/2004 |
| JP | 2010-49599  | 3/2010 |
| JP | 2011-22898  | 2/2011 |
| JP | 2013-206342 | 10/2013 |

\* cited by examiner

MACHINING METHOD AND A CONTROL DEVICE FOR A MACHINE TOOL

CROSS-REFERENCE TO RELATED APPLICATIONS

This application is a U.S. National Stage patent application of International Patent Application No. PCT/JP2014/071406, filed Aug. 13, 2014, which claims priority to International Patent Application No. PCT/JP2014/052316, filed Jan. 31, 2014, which is hereby incorporated by reference in the present disclosure in its entirety.

FIELD OF THE INVENTION

The invention relates a machining method and a control device for a machine tool for forming a curved surface or a polygon shape in a workpiece by moving a tool, such as a rotating tool (a milling tool, a grinding wheel with a shaft, or the like) or a non-rotating tool (a spring necked non-rotating cutting tool, or the like) relative to the workpiece.

BACKGROUND OF THE INVENTION

In a machine tool, errors may be generated in the motions of the feed axes due to the delay generated in the driving system by various causes. An example of the causes generating the motion errors includes, as well as changes in the machining load, a reverse mark which is generated when the tool path intersects a border between quadrants or when the rotation of a motor of a feed axis is reversed. In particular, a reverse mark, which is generated when a tool path intersects a border between the adjacent quadrants, is generally referred to a "quadrant protrusion". Reverse marks are undesirable machining marks in the form of notches or protrusions generated on a machined surface when the feeding direction is revered in a cutting process for machining a circle, an arc or a curved line such as an oval or a spiral. For example, reverse marks are generated by motion errors due to the backrushes, the resilient deformations and the frictional resistances in the X-, Y- and Z-axis feed devices (ball screws, bearings and guiding devices) when the feeding directions in the respective feed axes are reversed during a process for machining a curved surface by controlling the X-, Y- and Z-linear feed axes.

The invention in Patent Literature 1 adds a predetermined accelerating speed to a speed command, when a feed axis is reversed, in order to prevent or reduce the generation of the reverse marks. Further, the invention in Patent Literature 2 prevents the generation of reverse marks, in a machine tool for cutting a workpiece by moving a rotating tool relative to a workpiece, by controlling the rotational phase of the rotating tool. Furthermore, the invention in Patent Literature 3 reduces the influence, caused by the motion errors of a machining center, on the finishing accuracy of a machined surface by generating NC data so that the direction and the magnitude of the feeding speed vector at a cutting point between the end mill and the workpiece is maintained constant.

PRIOR ART DOCUMENTS

Patent Literature 1: Japanese Patent No. 2558580
Patent Literature 2: JP-A-2013-206342
Patent Literature 3: JP-A-2011-22898

SUMMARY OF THE INVENTION

According to the invention in Patent literature 1, the size of a reverse mark can be reduced, however the generation of reverse marks cannot be removed since the reverse marks are generated when the feeding directions of the linear feed axes are changed due to the backrushes, resilient deformations, frictional resistances or the like inevitably accompanied with the mechanical system. Further, when the feeding directions of the linear feed axes are changed, reverse marks are generated, and accordingly concentrated in a region where the positive and negative signs of the inclination of a tangent line or plane to a curved surface are changed. Thus, when a curved surface is machined by moving a tool along a plurality of tool paths while applying a plurality of pick feeds, there is a possibility that the workpiece thus machined cannot be used as a product even if the sizes (height) of the respective reverse marks are within a range of allowable machining errors, since the reverse marks are concentrated to form conspicuous machining marks in the form of streaks. In the invention in Patent Literature 2, there is a problem that the phase control of a rotating tool to prevent the reverse marks from being generated becomes difficult at high rotational speed or at high feeding speed. Further, the invention in Patent Literature 3 can remove a motion error generated in the same direction of the speed vector at the cutting point, among the motion errors associated with the mechanisms and the structure of a machining center. However, a circular tool path passes the X-axis and the Y-axis which form the boundaries between the quadrants, and therefore the X- and Y-axial feed motors must reverse during processing whereby the generation of reverse marks is unavoidable. Patent Literature 3 does not disclose the technological concept of dispersing the reversing positions of the feed motors for each of the circular tool path, and therefore the problem of the generation of reverse marks in the form of streaks is not solved.

The invention is directed to solve the problem of the prior art, and the object of the invention is to provide a machining method and a control device for a machine tool which disperses reverse marks across a machined surface so as to prevent the reverse marks from being intensively generated within a specific region, or which prevents the generation of reverse marks.

In order to achieve the object, the invention provides a machining method of machining a workpiece by moving a tool relative to the workpiece, characterized in that the workpiece is machined by using essential feed axes which are indispensable to machine the workpiece and at least one surplus feed axis which is not required to machine the workpiece whereby the reversing positions of the feed motors in the respective tool paths are dispersed or the reversing motions of the feed motors are removed.

According to another feature of the present invention, a control device for a machine tool for machining a workpiece by moving a tool relative to the workpiece, the machine tool having essential feed axes which are indispensable to machine the workpiece and at least one surplus feed axis which is not required to machine the workpiece, characterized by a superimposing section for executing the reversing position dispersing program including the movement of the surplus feed axis whereby the reversing positions of the feed motors on the machined surface of the workpiece are dispersed when executing the machining program for the essential feed axes is provided.

In a method of machining a workpiece by relatively moving a rotating tool and the workpiece, the workpiece is rotationally fed so as to disperse reverse marks generated on the machined surface of the workpiece. The workpiece may be rotationally fed about an axis of the rotating tool.

Further, the rotating tool may be moved relative to a workpiece along a curved line by controlling two linear feed axes simultaneously. A pick feed may is applied to the rotating tool in the directions perpendicular to the two linear feed axes. The two linear feed axes may be controlled so as to move the rotating tool relative to the workpiece along a next circular tool path. The workpiece can be rotated around an axis parallel a feed axis perpendicular to the two linear feed axes when the above described steps are repeated to form a desired curved surface in the workpiece.

The curved surface may be a convex or concave surface.

Further, the invention provides a control device for a machine tool, having three orthogonal linear feed axes and at least a rotational feed axis, for machining a workpiece to form a curved surface with a rotating tool moved relative to the workpiece. The control device executes a machining program for forming a desired curved surface in the workpiece by repeating the steps of controlling simultaneously two linear feed axes of the three orthogonal linear feed axes so as to move the rotating tool relative to the workpiece along a curved line, applying a pick feed in a direction perpendicular to the curved line, and controlling simultaneously the two linear feed axes so as to move the rotating tool relative to the workpiece along a next curved line, and meanwhile the control device executes a reversing position dispersing program to rotate the workpiece about an axis parallel to the linear feed axis perpendicular to the two linear feed axes.

According to the invention, the reverse marks are equally dispersed across the machined surface of a workpiece, or are not generated.

DETAILED DESCRIPTION OF THE INVENTION

Figure 2:
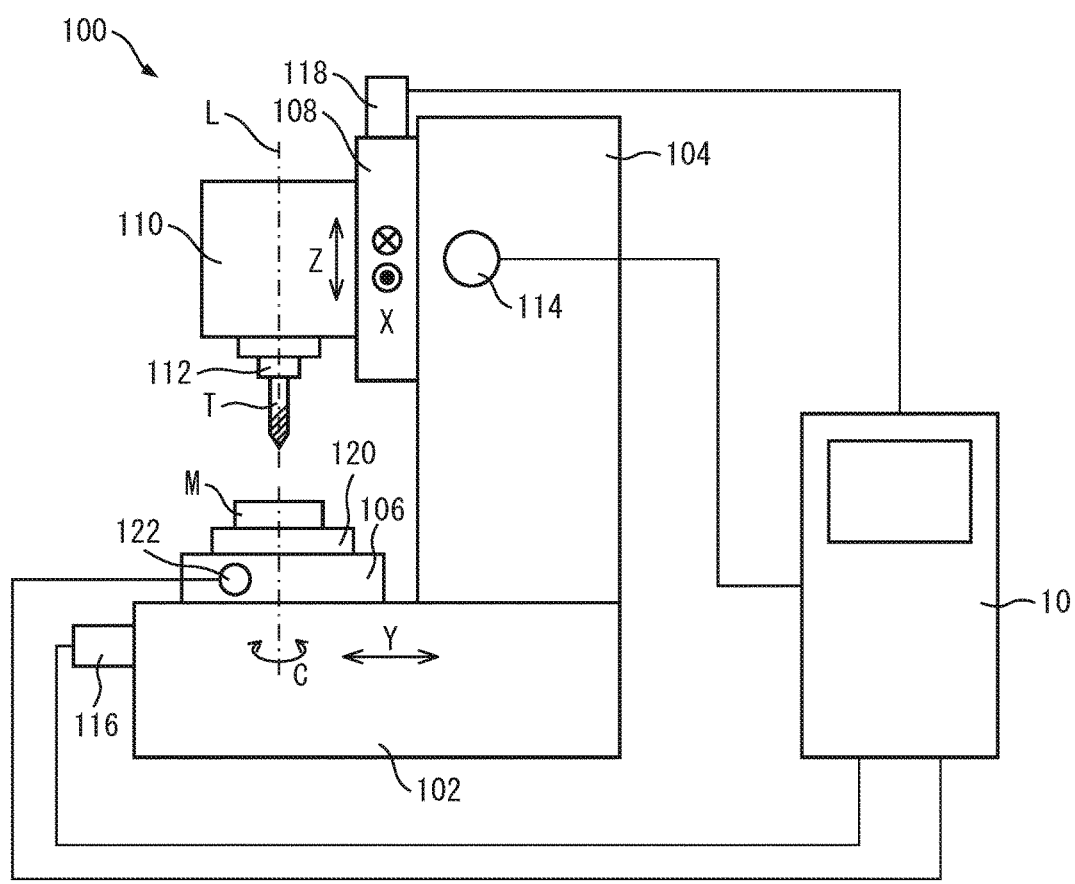
FIG. 2 is a side view of an example of the machine tool to which the invention is applied.

FIG. 2 shows an example of a machine tool to which the present invention is applied. In FIG. 2, a machine tool 100 according to a preferred embodiment of the invention is formed into a vertical machining center, comprising a bed 102 providing a base secured to a floor of a factory, a Y-axis slider 106 disposed at a front part (the left side part in FIG. 2) on a top face of the bed 102 for moving in the forward and rearward direction or in the Y-axis direction (the left and right direction in FIG. 2), a rotary table 120 mounted to a top face of the Y-axis slider 106, a column 104 secured to the top face of the bed 102 at a rear part (the right side part in FIG. 2) of the bed 102, an X-axis slider 108 disposed on a front face of the column 104 for moving in the left and right direction or in the X-axis direction (perpendicular to the plane of FIG. 2), and a spindle head 110, mounted to a front face of the X-axis slider 108 for moving vertical direction or in the Z-axis direction, for rotatably supporting a spindle 112.

The Y-axis slider 106 is mounted for reciprocation along a pair of Y-axis guide rails (not shown) extending in the Y-axis direction (the left and right direction in FIG. 2) on the top face of the bed 102. The bed 102 is provided with a Y-axis feed device for reciprocating the Y-axis slider 106 along the Y-axis guide rails, including a ball screw (not shown) extending in the Y-axis direction and a Y-axis servomotor 116 connected to an end of the ball screw. The Y-axis slider 106 is provided with a nut (not shown) which engages the ball screw. Further, a Y-axis scale (not shown) is mounted to the Y-axis slider 106 for measuring the coordinate position of the Y-axis slider 106 in the Y-axis direction.

The spindle head 110 supports the spindle 112 for rotation about a vertically extending axis L parallel to the Z-axis. The spindle 112 defines at one end a tool receiving hole (not shown) into which a rotating tool T is inserted. The spindle head 110 has a servomotor (not shown) for rotationally driving the spindle 112. The servomotor may be a built-in motor composed of a stator coil (not shown) provided on an inner surface of a housing of the spindle head 110 and a rotor coil (not shown) provided on the spindle 112, while the servomotor may be attached to the outside of the housing of the spindle head 110.

The X-axis slider 108 is mounted for reciprocation along a pair of X-axis guide rails (not shown) extending in the X-axis direction on the front face of the upper part of the column 104. The column 104 is provided with an X-axis feed device for reciprocating the X-axis slider 108 along the X-axis guide rails, including a ball screw (not shown)

extending in the X-axis direction and an X-axis servomotor 114 connected to an end of the ball screw. The X-axis slider 108 is provided with a nut (not shown) which engages the ball screw. Further, an X-axis scale (not shown) is mounted to the X-axis slider 108 for measuring the coordinate position of the X-axis slider 108 in the X-axis direction.

The spindle head 110 is mounted for reciprocation along a pair of Z-axis guide rails extending in the Z-axis direction (up and down direction in FIG. 2) on the front face of the X-axis slider 108. The X-axis slider 108 is provided with a Z-axis feed device for reciprocating the spindle head 110 along the Z-axis guide rails, including a ball screw (not shown) extending in the Z-axis direction and an Z-axis servomotor 118 connected to an end of the ball screw. The spindle head 110 is provided with a nut (not shown) which engages the ball screw. Further, a Z-axis scale (not shown) is mounted to the spindle head 110 for measuring the coordinate position of the spindle head 110 in the Z-axis direction.

The rotary table 120 is rotatable about an axis parallel to the Z-axis, and has a workpiece mounting face for mounting a workpiece M, whereby the rotary table forms a C-axis feed device providing a rotational feed axis about the axis. The Y-axis slider 106 is provided with a C-axis servomotor 122 for rotationally driving the rotary table 120 and a rotary sensor (not shown), e.g., a rotary encoder for measuring the rotational position of the rotary table 120.

The X-axis servomotor 114, the Y-axis servomotor 116, the Z-axis servomotor 118 and the C-axis servomotor 122, and the X-axis scale, the Y-axis scale, the Z-axis scale and the rotary sensor are connected to an NC device 10 for controlling the machine tool 100. The NC device 10 controls the electric powers (the current values) supplied to the X-axis servomotor 114, the Y-axis servomotor 116, the Z-axis servomotor 118 and the C-axis servomotor 122.

As described above, reverse marks are defectives in the form of notches or protrusions generated on a machined surface when the positive and negative signs of the inclination of a tangent line is changed or the feeding directions of the respective X-, Y- and Z-linear feed axes are changed in a cutting process for machining a circle, an arc, a cylindrical surface, a spherical surface, a polygon shape or the like. For example, in case of machining a metal mold in FIG. 3 for producing an O-ring, the generation of reverse marks are concentrated on the surface of a circular groove G in a workpiece around regions where the feeding directions of the two linear feed axes of the X- and Y-axes are changed, i.e., along the boundaries QB between the quadrants relative to the center O of the circular groove G. The invention is directed to disperse reverse marks across the machined surface, i.e., it is not directed to prevent the generation of reverse marks, in machining processes in which reverse marks can be generated. It is preferable in conjunction with the conventional technologies for reducing the sizes of reverse marks (e.g., the above-described invention in Patent Literature 1).

Figure 1:
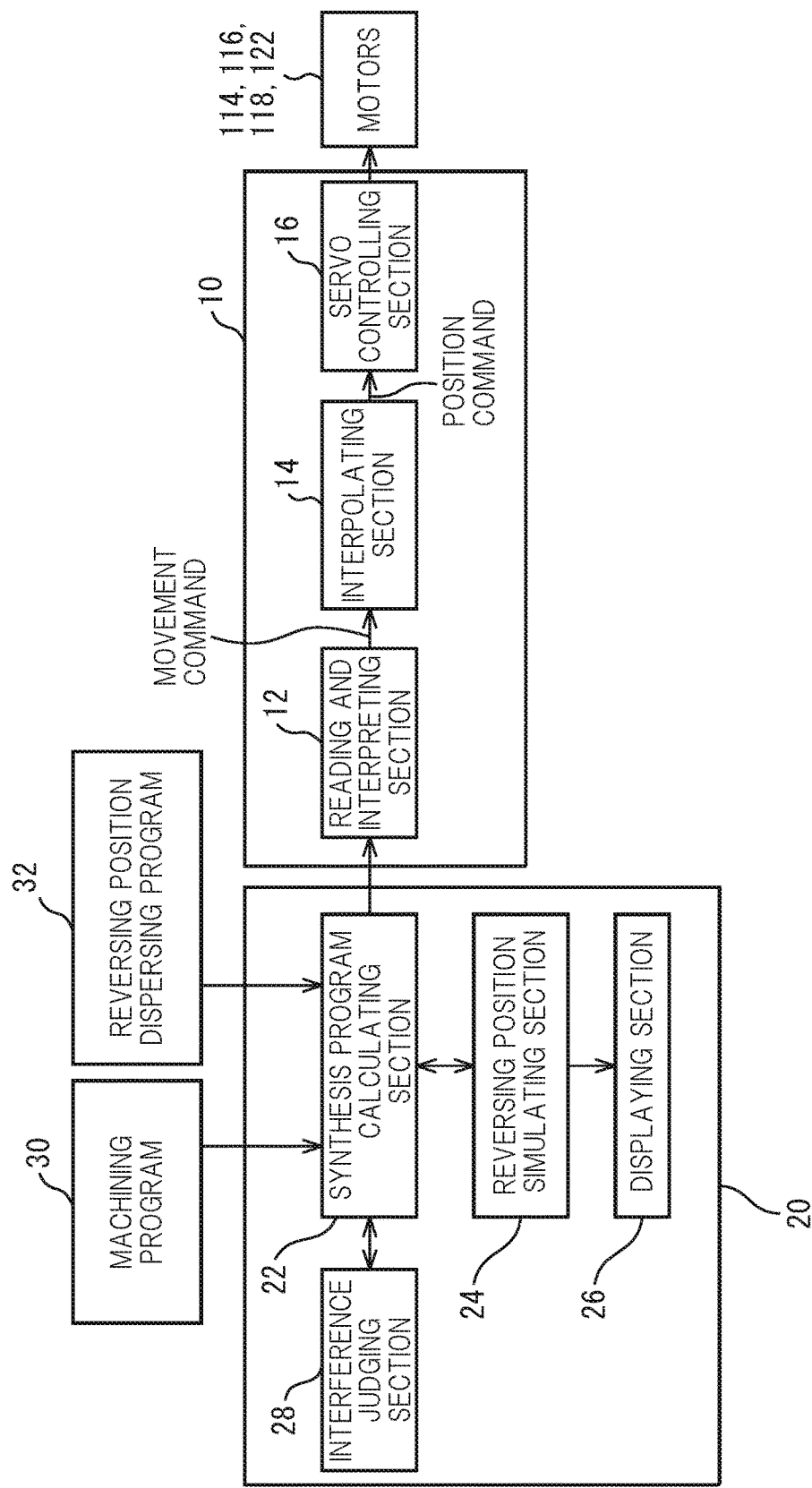
FIG. 1 is a block diagram of a control device for a machine tool according to a first embodiment of the invention.

With reference to FIG. 1, a block diagram of an example of an NC device which carries out the machining method of the invention is shown. An NC device 10 comprises a reading and interpreting section 12, an interpolating section 14 and a servo controlling section 16. The reading and interpreting section 12 reads and interprets a machining program, received from a tool path generating device 20, so that movement commands are output to the interpolating section 14. The movement commands include the feeding amounts and speeds in the X-, Y-, Z- and C-axis directions.

The interpolating section 14 interpolates the movement commands, in the X-, Y-, Z- and C-axis directions, via calculation based on an interpolation function, and outputs position commands, fitted to an interpolation function and the respective X-, Y-, Z- and C-axial feed speeds, to the servo-controlling section 16. Based on the respective received X-, Y-, Z- and C-axial position commands, the servo-control section 16 outputs electric currents for driving respective X-, Y-, Z- and C-feed axes of the machine tool 100 to the servomotors 114, 116, 118 and 122 of the X-, Y-, Z- and C-axes.

The tool path generating device 20 comprises a synthesis program calculating section 22, a reversing position simulating section 24, a displaying section 26 and an interference judging section 28. A machining program 30 for machining a workpiece M and a reversing position dispersing program 32 for feeding the workpiece M rotationally around the C-axis are input into the synthesis program calculating section 22.

The machining program 30 and the reversing position dispersing program 32 may be input into the synthesis program calculating section 22 via a computer network such as a LAN from a machining program generating device (not shown) such as a CAM (Computer Aided Manufacturing) device. The tool path generating device 20 may be provided with an input device (not shown) such as a key board or a touch panel, so that via the input section an operator can input a machining program 30 and the reversing position dispersing program 32 into the synthesis program calculating section 22 or can edit the machining program 30 and the reversing position dispersing program 32 which has been input into the synthesis program calculating section 22.

The machining program per se can run alone to control minimum feed axes required in order to machine a workpiece M. The feed axes controlled by the machining program are referred to essential feed axes. In contrast, the reversing position dispersing program is a program for controlling a surplus feed axis different from the essential feed axes, and per se cannot run alone to machine a workpiece M.

The synthesis program calculating section 22 generates a synthesized program based on the machining program 30 and the reversing position dispersing program 32. The synthesized program is output to the reading and interpreting section 12 of the NC device 10. The synthesized program is also sent to the reversing position simulating section 24. The reversing position simulating section 24 calculates to simulate the machined surface generated on the workpiece M, based on the simulation results, the positions of reverse marks may be displayed on the displaying section 26 graphically and/or numerically. The sizes of reverse marks may be simulated and displayed.

The interference judging section 28 determines whether or not a shank, a cutter body or a part which does not define a cutting edge of a tool T interferences with a workpiece M, or the tool T interferences with a stationary element of the machine tool 100. As a results, if no possible interference is determined, then it becomes ready to run the synthesized program. Contrary, if it is determined that an interference will be caused by running the synthesized program, then the synthesized program is disabled, and simultaneously a warning of interference is displayed on the displaying section 26.

A machining program 30 for forming a circular groove G in a workpiece M and a reversing position dispersing program 32 for rotating the rotary table 120 about the C-axis are input into the synthesis program calculating section 22 of the tool path generating device 20. In this embodiment, the machining program 30 includes a process for moving the rotating tool T relative to the workpiece M by controlling only two linear feed axes simultaneously so as to follow a curved line.

Figure 3:
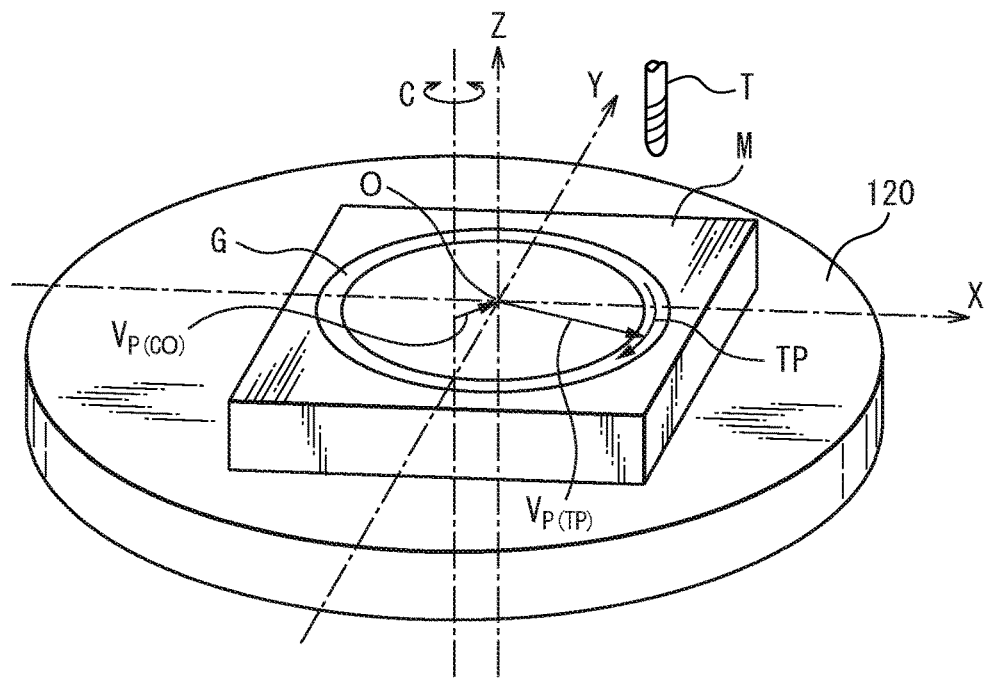
FIG. 3 is a schematic illustration of an example of the workpiece machined by the machining method of the invention.
Figure 4:
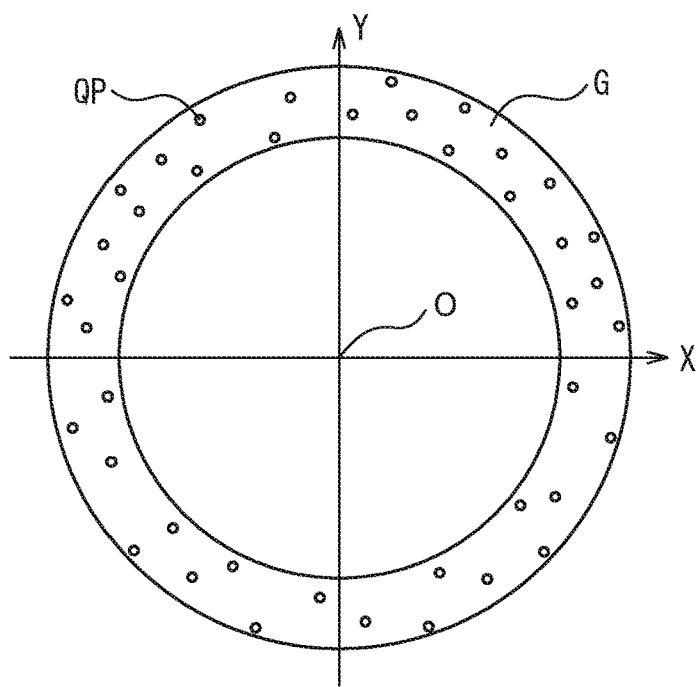
FIG. 4 is a schematic illustration of simulation results of machining a workpiece by the machining method of the invention.

In the example of FIG. 3, the machining program 30 controls two linear feed axes, i.e., the X- and Y-axes as the essential feed axes so as to move a ball end mill T, providing the rotating tool, relative to the workpiece M along a circular tool path TP, then applies a pick feed to the ball end mill T in X- and Z-axial directions, then controls the two linear feed axes so as to move the ball end mill T relative to the workpiece M along a next circular tool path TP, and repeats these steps to form a circular groove G, having a semicircular section, in the upper face of the workpiece M. Accordingly, when the ball end mill T moves relative to the workpiece M along a circular tool path TP, only the two linear feed axes, i.e., X- and Y-feed axes are controlled and the Z-axis feed device is locked. The circular tool path TP is formed of a plurality of concentric circles about the center O. The ball end mill T moves along the circular tool path T several times whereby the circular groove G is finished.

The reversing position dispersing program 32 is a program for rotating the rotary table 120 about the C-axis or rotationally feeding the workpiece M about the C-axis, i.e., a rotationally feeding axis parallel to the Z-axis perpendicular to X- and Y-axes, which are controlled so as to move the ball end mil T relative to the workpiece M along a circle of the circular tool path TP, whereby the reverse marks, which are generated when the workpiece M is machined, are dispersed across the machined surface, preventing them from being concentrated in a certain part of the workpiece. In this example, the C-axis provide at least one surplus feed axis. The feeding direction around the C-axis may be simply in the clockwise direction, in the counter-clockwise direction or the combination of the clockwise and counterclockwise directions. The reversing position dispersing program 32 may include a program for controlling the Z-axis and W-axis or a program for reciprocally rotating or swinging an oscillation member about the B-axis.

The synthesis program calculating section 22 analyzes the machining program 30 to extract the code for defining the circular tool path TP for forming the circular groove G in the top face of the workpiece M. The synthesis program calculating section 22 further analyzes the reversing position dispersing program 32 to extract the cord for feeding around the C-axis. Further, the synthesized program 22 calculates a new too path (a synthesized tool path) to generate a synthesized program, based on the extracted code for the C-feed axis, by combining the change in the position of the origin of the circular too path TP, e.g., in FIG. 3, the position vector $V_{P(CO)}$ of the center O of the circular groove G relative to the center of the C-axis with the position vector $V_{P(TP)}$ of the circular tool path TP. The magnitude of the position vector $V_{P(CO)}$ corresponds to the amount of deviation the center O of the circular groove G from the center of the C-axis. The generated synthesized program includes a movement command for correcting the deviation according to the rotational feed of the C-axis by simultaneously controlling the X- and Y-axes whereby the position of the tool relative to the workpiece is not deviated from the circular tool path TP for machining, even if the workpiece M is mounted to the rotary table 120 with the center O of the circular groove G is offset from the center of the C-axis. The movement command is combined to a movement command for machining along the circular tool path TP by simultaneously controlling the X- and Y-axes. In this connection, it should be noted that if the workpiece M is mounted to the rotary table 120 so that the center of the C-axis and the center O of the circular groove G are aligned with each other, the machining program 30 and the reversing position dispersing program 32 can be combined simply with each other. The synthesis program calculating section 22 outputs the synthesized program to the reading and interpreting section 12 and the reversing position simulating section 24 of the NC device 10. The synthesis program calculating section 22 provides a superimposing section recited in the claims.

The NC device 10 controls the X-, Y-, Z- and C-axis servomotors 114, 116, 118 and 122, as described above, based on the synthesized program from the synthesis program calculating section 22. The reversing position simulating section 24 displays the machined surface to be formed in the workpiece M and the reverse marks generated on the machined surface, graphically and/or numerically, based on the synthesized program from the synthesis program calculating section 22. The of the X-, Y- and C-axial positions along the tool path are displayed when the rotation of the X-axis servomotor 114 or the Y-axis servomotor 116 is reversed.

Figure 5:
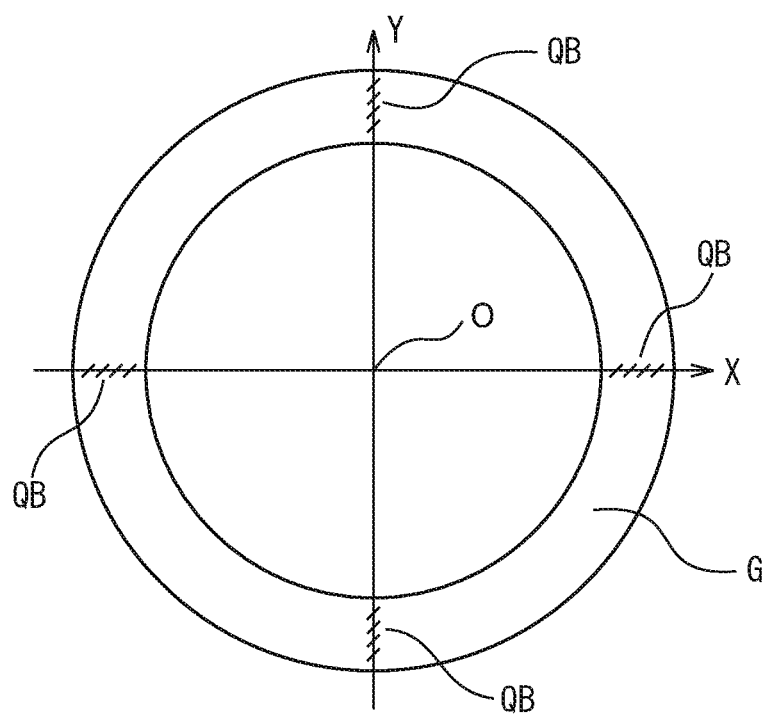
FIG. 5 is a schematic side view of a workpiece machined by the prior art.

In the prior art, when forming a circular groove G on a top face of a workpiece M with a rotating tool T, i.e., a ball end mill, as illustratively shown in FIG. 3, providing a metal mold for producing an O-ring, the reverse marks are intensively generated, as shown by hatching in FIG. 5, on the surface of the circular groove G along four boundaries QB between the quadrants relative to the center O of the circular groove G in the X-Y plane. In the contrast, according to the invention, the reverse marks QP are equally dispersed along the surface of the circular groove G. In order to disperse equally, it is required to adjust the rotational direction and the rotational speed of the C-axis in the reversing position dispersing program 32 while viewing the status of dispersion of the reverse mark displayed on the displaying section 26. The provision of the displaying section 26 facilitates the adjusting work. For example, in case of machining a circular groove G, having an inner diameter of 49.6 mm and groove width of 5.7 mm, with a ball end mill having outer diameter of 1.5 mm, the machining program 30 defines the circular tool path TP including 300 concentric circles except for the pick feed portions. Accordingly, the tool T moves along the circular tool path TP 300 times with four reverse marks formed per round. Therefore, the adjustment work may be repeatedly carried out through a trial and error process so that the sets of four reverse marks on the respective circles of the circular tool path TP are offset from each other whereby the reverse marks are visually substantially equally distributed along the circular groove G. Conventionally, reverse marks are not dispersed, and therefore, four radially extending lines (streaks) are formed in the circular groove G at every 90 degrees. The four lines are removed by a difficult grind work, which can be avoided by using the method of the invention.

Figure 6:
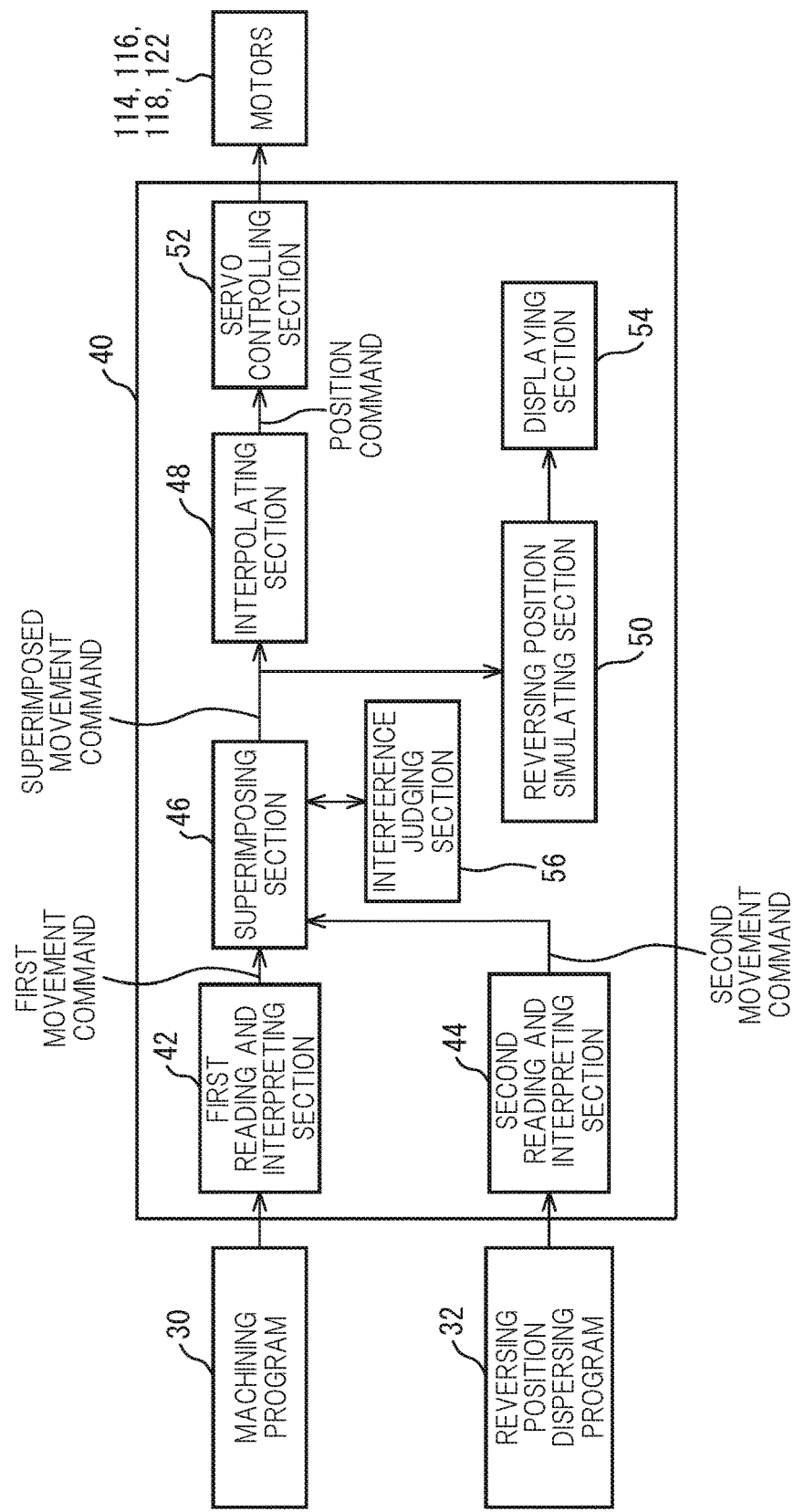
FIG. 6 is a block diagram of a control device for a machine tool according to a second embodiment of the invention.

With reference to FIG. 6, a controlling device for a machine tool according to a second embodiment of the invention will be described below.

The NC device 10 and the tool path generating device 20 of the first embodiment are replaced with an NC device 40 having two control systems in the second embodiment. The NC device 40 comprises first and second reading and interpreting sections 42 and 44, a superimposing section 46, an interpolating section 48, a reversing position simulating section 50, a servo controlling section 52, a displaying section 54 and an interference judging section 56.

The first reading and interpreting section 42 reads and interprets a machining program 30, and outputs first movement commands to the superimposing section 46. The first movement commands include the feeding amounts and speeds in the X-, Y- and Z-axis directions. The second reading and interpreting section 44 reads and interprets a reversing position dispersing program 32, and outputs second movement commands to the superimposing section 46. The second movement commands include the rotational feeding amounts and speeds in the C-axis direction.

The superimposing section 46 superimposes the movement commands output from the first and second reading and interpreting sections 42 and 44. Accordingly, superimposed movement commands, provided by combining the position vector $V_{P(CO)}$ of the center O of the circular groove G relative to the center of the C-axis with the position vector $V_{P(TP)}$ of the circular tool path TP, and rotational movement commands for the C-axis are output to an interpolating section 48. The interpolating section 48 interpolates the superimposed movement commands and the rotational movement commands for the C-axis via calculation based on an interpolation function, and outputs position commands to the servo-controlling section 52. Based on the respective received X-, Y-, Z- and C-axial position commands, electric currents for driving respective X-, Y-, Z- and C-feed axes of the machine tool 100 are output to the servomotors 114, 116, 118 and 122 of the X-, Y-, Z- and C-axes. The reversing position simulating section 50 simulates by a calculation the positions where the reverse mark are generated, similar to the first embodiment, and the positions are displayed on the displaying section 54. Further, the interference judging section 56 works similar to the interference judging section 28 of the first embodiment.

The superimposing section, the reversing position simulating section and the displaying section can be incorporated in the tool path generating device, i.e., in a CAM system, as in the first embodiment, or in the NC device as in the second embodiment.

Figure 7:
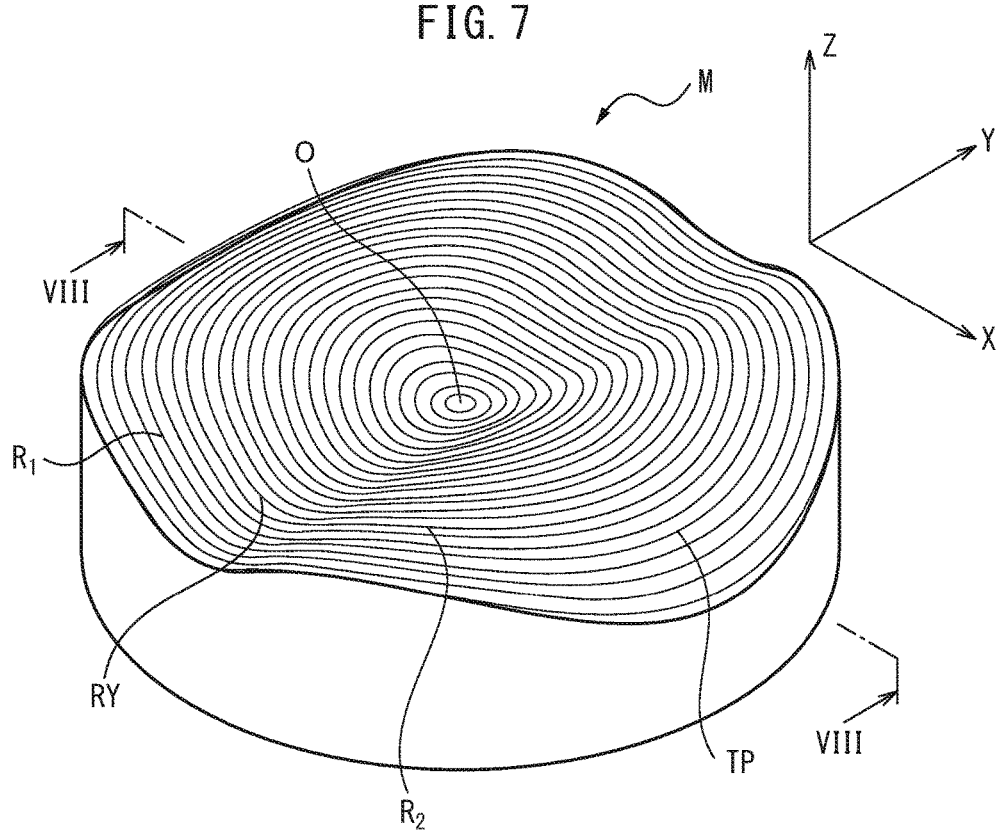
FIG. 7 a perspective view of a workpiece machined by another example of the machining method of the invention.
Figure 8:
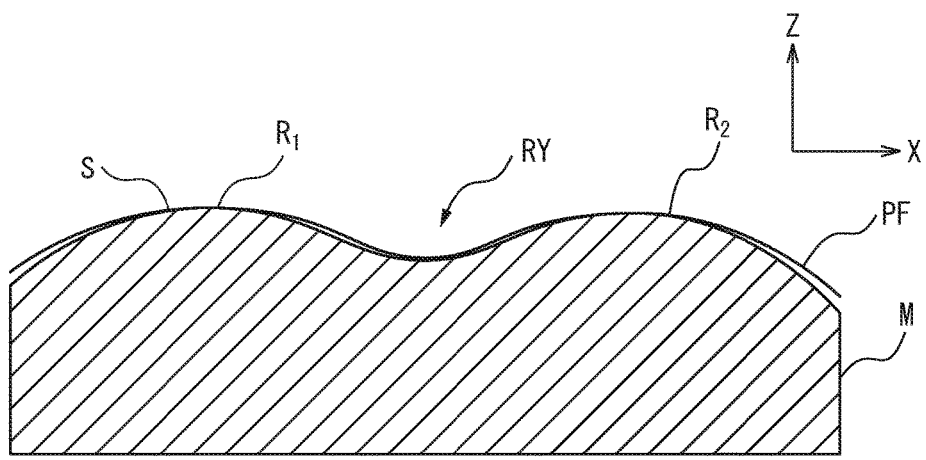
FIG. 8 is a section of the workpiece along line VIII-VIII in FIG. 7.

In the above described embodiments, while the invention is applied to a metal mole for forming an O-ring, the invention is not limited thereto. For example, the invention can be applied to form a three dimensional curved surface as shown FIGS. 7 and 8. In FIGS. 7 and 8, the workpiece M has a upper surface or a machined surface S in the form of smooth waves. In particular, the upper surface or the machined surface S defines a recess portion RY extending in the Y-axis direction to intersect the center O and two ridge portions R1 and R2 disposed at either side of the recess portion RY to extend in the Y-axis direction, as shown in FIG. 8 illustrating a section in the X-Z plane including the X-axis and Z-axis.

Figure 10:
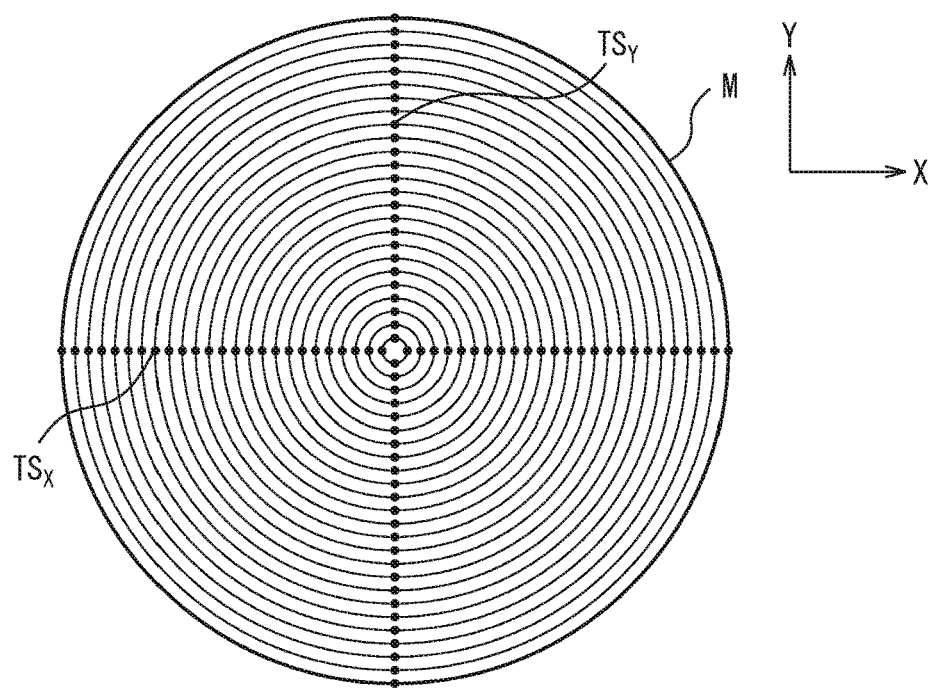
FIG. 10 is a plan view of the workpiece of FIG. 9.
Figure 11:
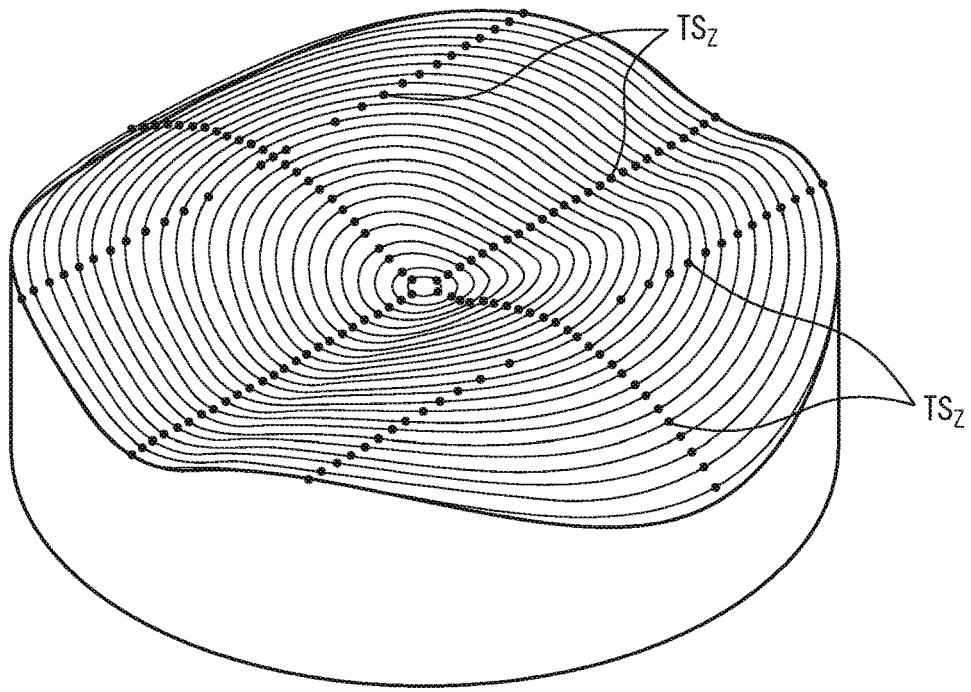
FIG. 11 is perspective view of the workpiece of FIG. 7 machine by the prior art, showing the reverse marks formed by the reverses of the Z-axis servomotor.
Figure 12:
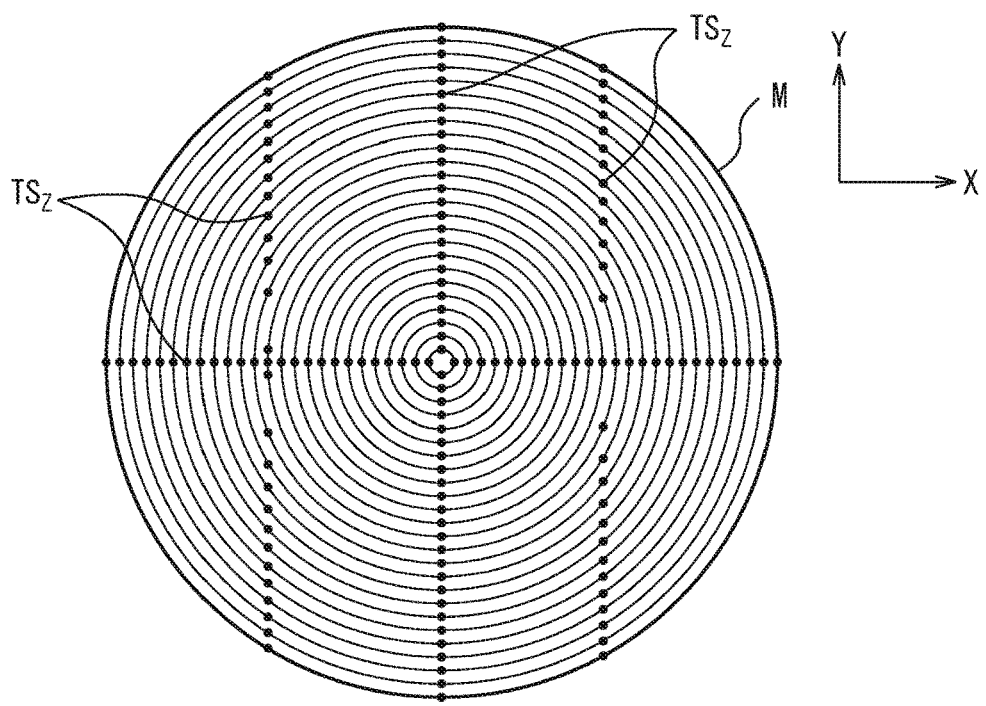
FIG. 12 is a plan view of the workpiece of FIG. 11.

When machining the workpiece M with a tool T moved relative to the workpiece M along a plurality of concentric circular tool paths TP as shown FIG. 7 by controlling the essential linear feed axes of the X-, Y- and Z-axes, reverse marks TSz, shown in FIGS. 11 and 12, are formed when the rotational direction of the Z-axis feed motor is changed, as well as reverse marks TSx and TSy (FIGS. 9 and 10) are formed when the rotational directions of the respective X-axis feed motor and Y-axis feed motor are changed.

Figure 9:
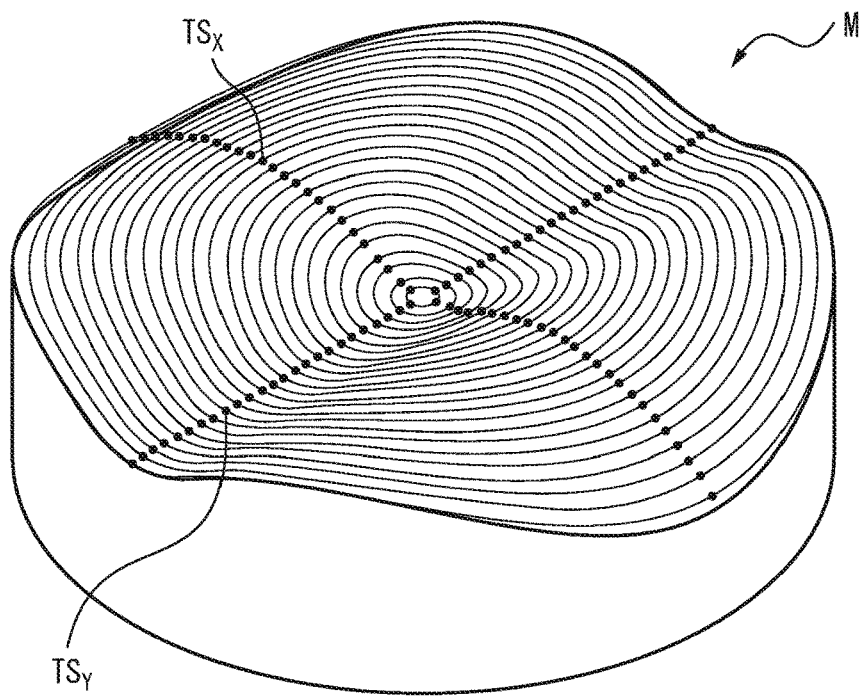
FIG. 9 is perspective view of the workpiece of FIG. 7 machine by the prior art, showing the reverse marks formed by the reverses of the X- and Y-axis servomotors.

The reverse marks TSx and TSy shown in FIGS. 9 and 10 can be dispersed in the rotational direction of the C-axis by controlling the C-axis as described above. However, the reverse marks TSz formed when the rotational direction of the Z-axis feed motor is changed cannot be dispersed by controlling the C-axis. In order to disperse the reverse marks TSz, an embodiment shown in FIG. 13 has a W-axis feed device, as a surplus feed axis, for vertically reciprocally moving a quill 109 relative to the spindle head 110, in addition to the Z-axis.

Figure 13:
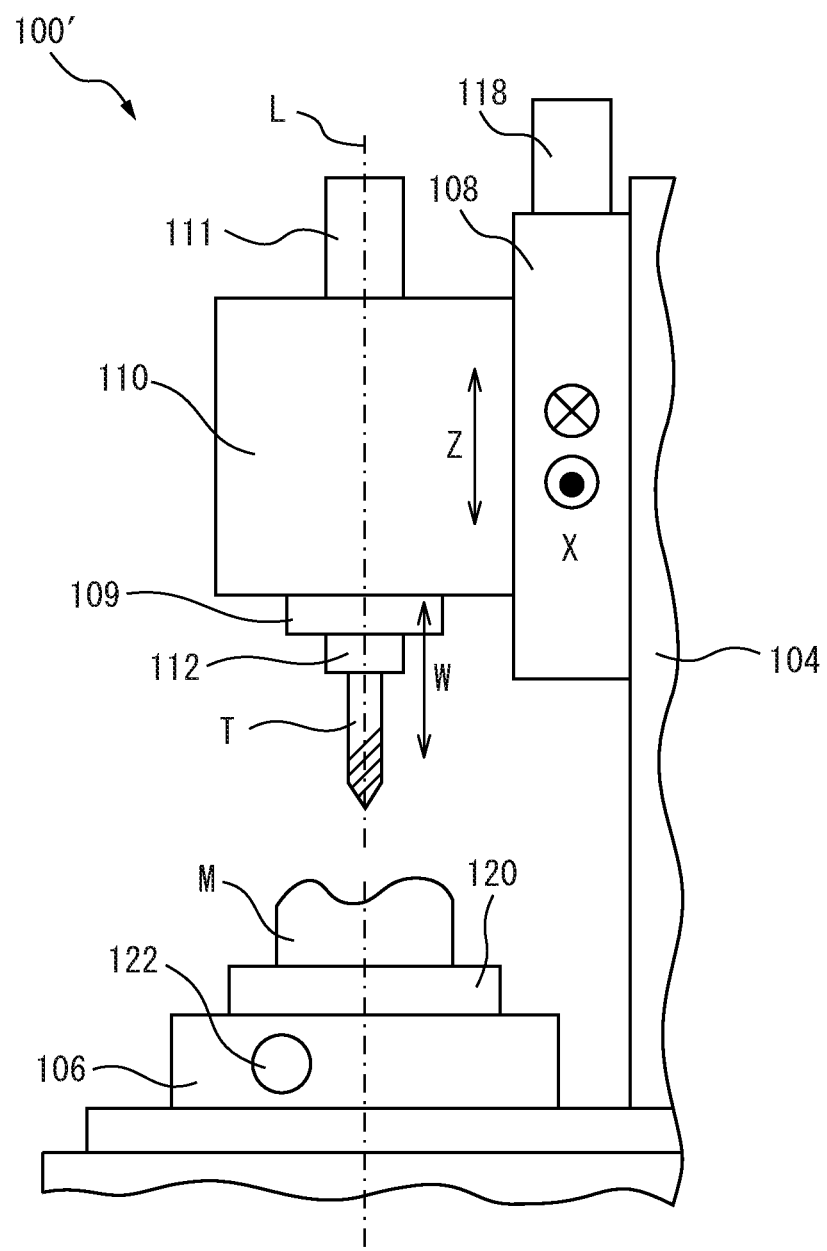
FIG. 13 is a partial side view of a machine tool showing a variation of the machining method of the invention.

In FIG. 13, the machine tool 100' is provided with the W-axis feed device, providing a surplus feed axis, comprising a ball screw (not shown), a W-axis servomotor 111, connected to an end of the ball screw. A nut, engaging the ball screw, is mounted to the quill 109. A W-axis scale (not shown), for measuring the coordinate position of the quill 109 in the W-axis direction, is mounted to the spindle head 110. Assuming the position of the tool T (ball end mil) relative to the workpiece M is (x, y, z), and the command values for the respective axis are mx, my, mz and mw (additional axis of W-axis), then x=mx, y=my, z=mz+mw. The Added W-axis enables the Z-axial position relative to the workpiece M to be defined by the combination of the command values mz and mw. Accordingly, there are infinite combinations providing one relative position in the Z-axis. For example, the combination of mz=10 and mw=−5 and the combination of mz=−7 and mw=12 are equivalent regarding the Z-axial position relative to the workpiece M.

When machining the workpiece M of FIGS. 7-12 with the machine tool 100' of FIG. 13, the ball end mill T, providing the rotating tool, is moved relative to the workpiece M along a tool path TP by controlling the three linear feed axes of the X-, Y- and Z-axes, then a pick feed PF is applied to the ball end mill T in the X- and Z-axial directions, then the ball end mill T is moved relative to the workpiece M along a next circular tool path TP by controlling the three linear feed axes of X-, Y- and Z-axes, and these steps are repeated so as to form the upper surface or the machined surface S in the form of smooth waves in the workpiece M. Each tool path TP is a circle tool path when projected to a plane (X-Y plane) perpendicular to the Z-axis. Accordingly, the X- and Y-axes are controlled so as to move the ball end mill T along a circle, while the Z-axis is controlled so that the end of the ball end mill T follows the wave form upper surface.

In this connection, the reversing position dispersing program 32 is a program for rotating the rotary table 120 around the C-axis so as to disperse the reverse marks to be generated during the machining of the workpiece M, across the machined surface, whereby to prevent the reverse marks from being concentrated in specific regions, and for controlling the Z-axis and the W-axis so as to disperse the reverse marks TSz, to be generated when the Z-axis feed device is reversed, across the machined surface S. Accordingly, the reversing positions of the Z-axis servomotor 118 can be dispersed across the machined surface of the workpiece M by dividing the original Z-axis command value into the command values to the Z-axis and the W-axis, since there are infinite combinations of the command values mz, mw for one Z-axis relative position.

Figure 14:
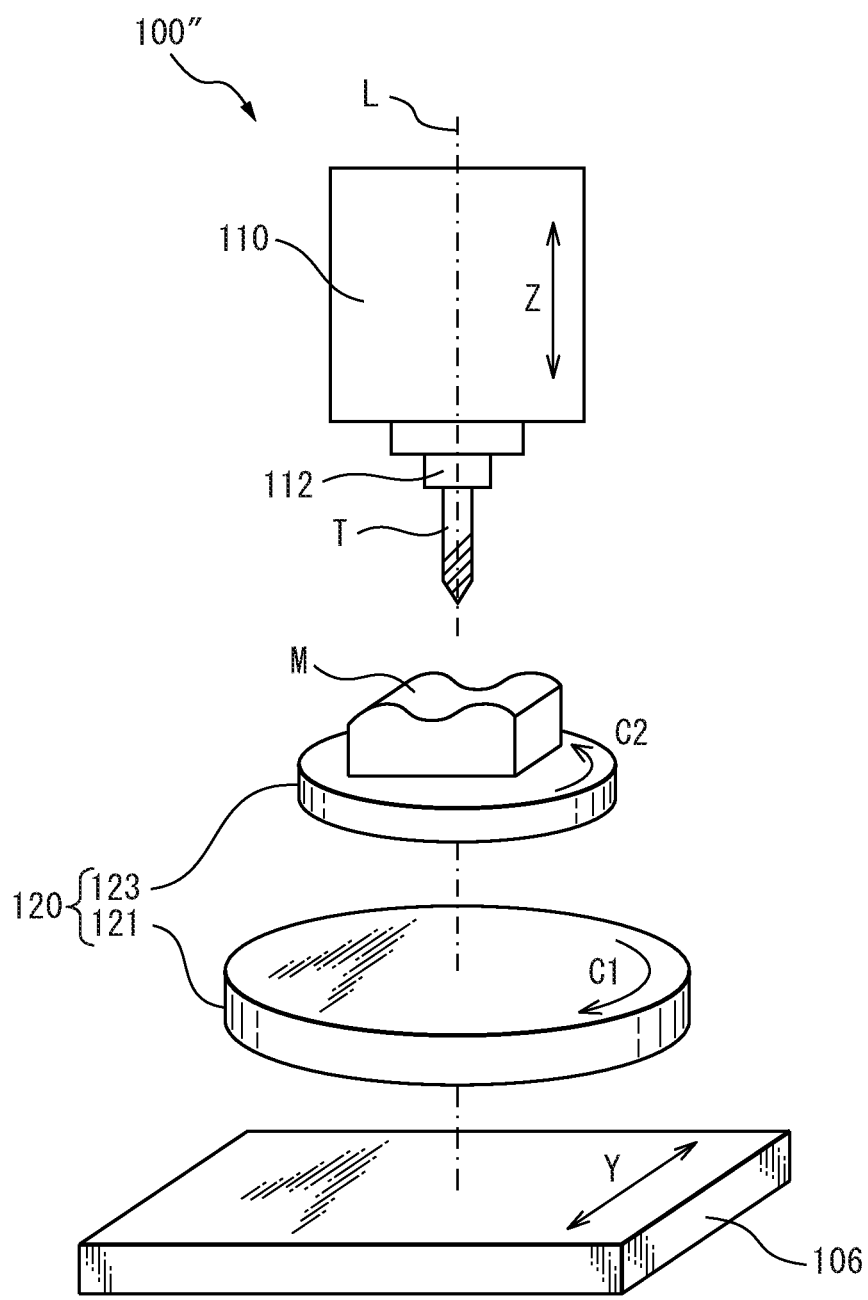
FIG. 14 is schematic illustration of a part of a machine tool showing a further variation of the machining method of the invention.

With reference to FIG. 14, a machine tool 100" according to another embodiment of the invention comprises a rotary table 120 forming the C-axis which provides the excess feed axis. The rotary table comprises first and second rotary tables 121 and 123. In this embodiment, the first and second rotary table 121 and 123 rotate in the opposite directions to each other, i.e., in the example of FIG. 14, the first rotary table 121 rotates in the clockwise direction while the second rotary table 123 rotates in the counter clockwise direction. Assuming that the command values to the first and second rotary tables 121 and 123 are c1 and c2, respectively, then c1+c2 provides the command value to the C-axis, i.e., the amount of rotation of the workpiece M. By forming the rotary table 120 by the concentric first and second rotary tables 121 and 123, which rotate in the opposite directions to each other, it is possible to control the C-axis without reversing the rotational direction of the motor, enabling the machining without generating the reverse marks.

Figure 15:
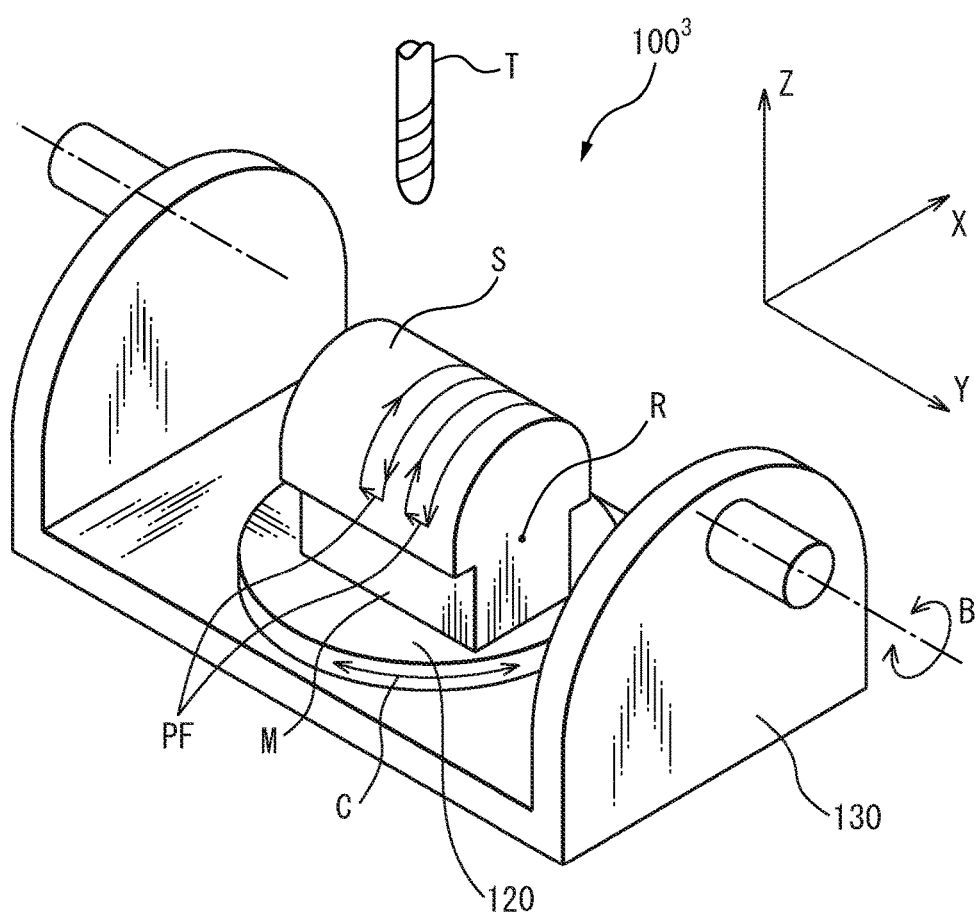
FIG. 15 is schematic partial perspective view a machine tool showing a further variation of the machining method of the invention.
Figure 16:
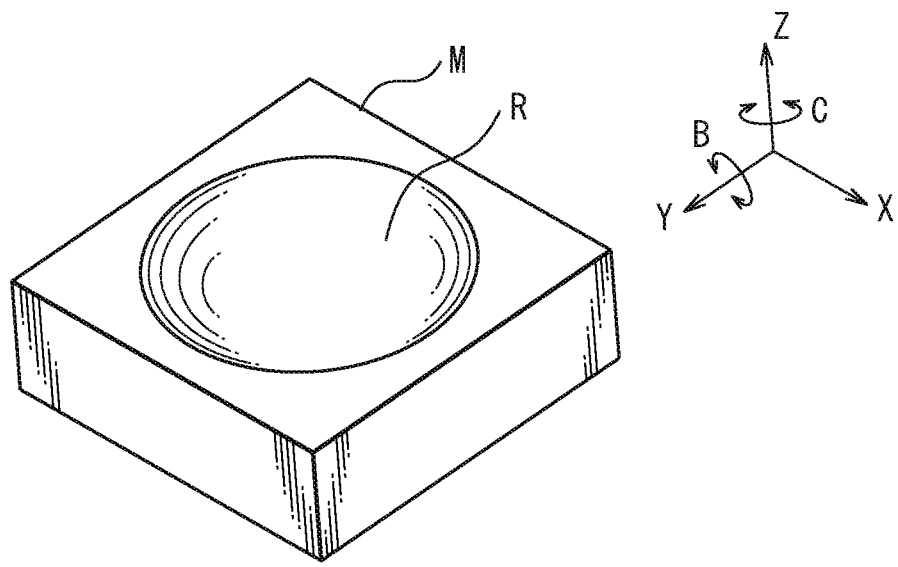
FIG. 16 is perspective view of an example of a workpiece to be machined by the machine tool of FIG. 15.

In the above-described embodiments, the reverse marks, formed in the circular grooves or on the wavy machined surface are dispersed by rotating the C-axis, i.e., a rotational feed axis parallel to the Z-axis. However, the invention is not limited to those embodiments, the B-axis, i.e., a rotational feed axis parallel to the Y-axis may be rotated, as a machine tool $100^3$ in FIG. 15. FIG. 15 shows an example for machining a outer peripheral surface S of a workpiece M in the form of a cylinder defining an axis R. The rotary table 120 of the machine tool $100^3$ is mounted to a top face of a swinging member 130 mounted to the Y-axis slider 106 for swinging about the B-axis. The workpiece M is mounted to the top face of the rotary table 120 so that its axis R is parallel to the Y-axis.

In the machine tool $100^3$ of FIG. 15, when the outer peripheral surface of the workpiece M is machined, the machining program 30 is a machining program for controlling the X-, Y- and Z-feed axes in order to feed a ball end mill as the rotating tool T relative to the workpiece M along a plurality of circular arc curves about the axis R of the workpiece M parallel to the Y-axis with pick feeds being applied in the Y-axis direction. Accordingly, when feeding along one of the circular arc curves, the Y-axis feed device is locked while only the X- and Z-linear feed axis are controlled. Meanwhile, the C-axis is locked. The reversing position dispersing program 32 a program for reciprocally rotating or swinging the swinging member 130 about an axis parallel to the Y-axis, i.e., about the B-axis.

Accordingly to the prior art, when machining as shown in FIG. 15, the reverse marks are generated intensively at the highest part in the outer surface of the workpiece M, along a line parallel to the axis R. According to the invention, the reverse marks are substantially equally dispersed across the outer surface S of the workpiece M.

In a further embodiment, when the outer surface of a conical workpiece M, mounted to a rotary table 120, is machined with a ball end mill along a spiral tool path, the reverse marks can be dispersed along the tool path. In this embodiment, the adjacent tool path is referred to one convolution of the tool path distant by the lead of the spiral. Further, even if the machined surface of a workpiece is flat and the shape of the tool path is a shape, such as a circle or a spiral accompanied with changes of the quadrants, the points, where the reverse marks are generated, can be dispersed along the tool path.

Figure 17:
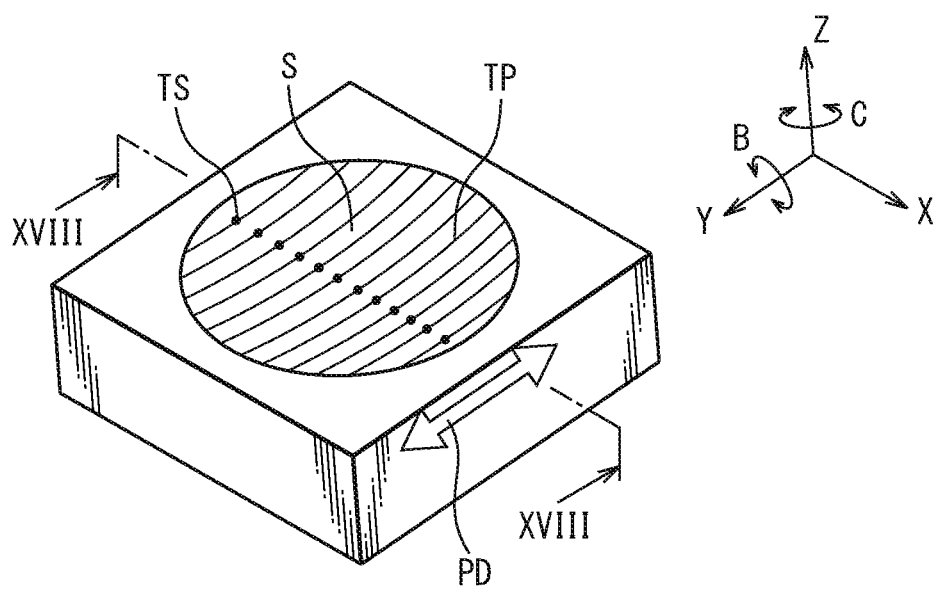
FIG. 17 is a perspective view of the workpiece of FIG. 16, showing the reverse marks formed due to the reverses of the X-axis servomotor, when machined by the prior art.
Figure 18:
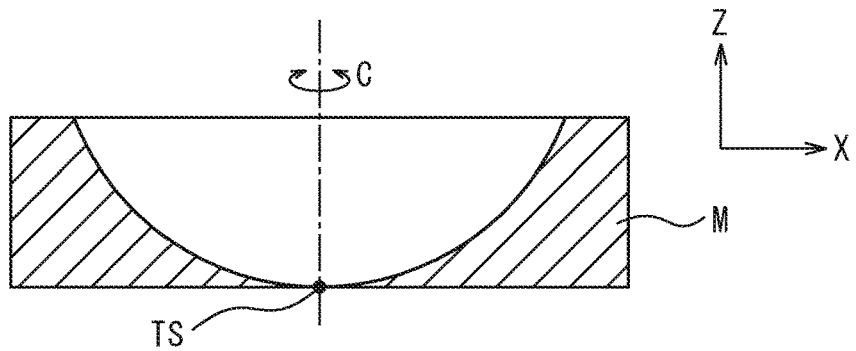
FIG. 18 is a section along line XVIII-XVIII in FIG. 17.

Furthermore, the machine tool $100^3$ according to the embodiment shown in FIG. 15 is effective to machine a workpiece M having a recess R formed in the top face of a block in the form of a rectangular parallelepiped, for example a lens forming mold. As shown in FIG. 17, when a workpiece M is machined with a tool (ball end mill) T fed along a plurality of curved tool paths TP, extending in an arrow PD, along a concave bottom (machined surface S), the reverse marks TS are formed at the lowest points along the respective tool paths TP. The reverse marks TS are aligned with each other in the X-axis direction. The positions of the reverse marks TS are not changed as shown in FIG. 18 even if the C-axis is rotated as in the described embodiments.

Figure 19:
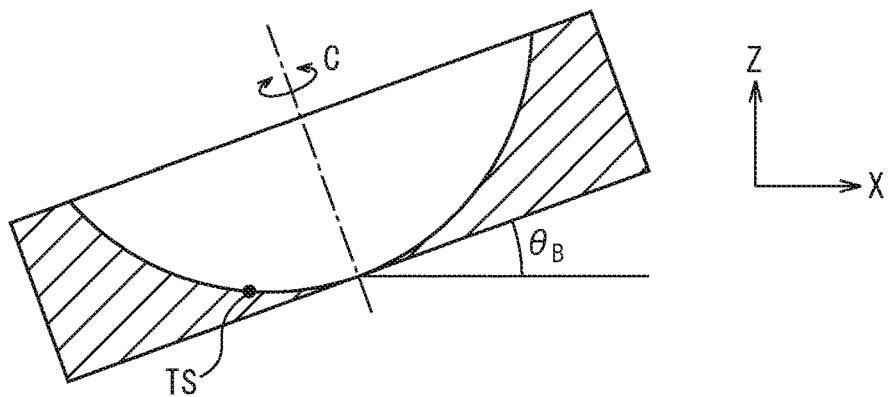
FIG. 19 is a schematic section showing the positions of the reverse marks formed on the workpiece of FIG. 16 when machined by the machining method of the invention.
Figure 20:
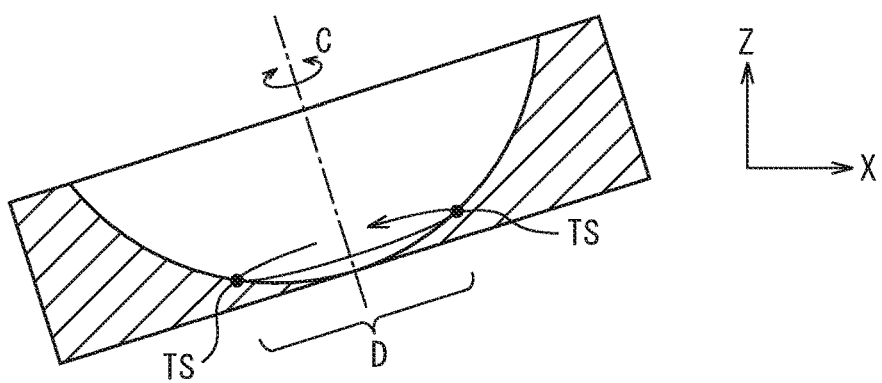
FIG. 20 is a schematic section showing the dispersion of the reverse marks formed on the workpiece of FIG. 16 when machined by the machining method of the invention.

Accordingly, in the machine tool $100^3$ of FIG. 15, the C-axis is rotated with the swinging member 130 being rotated about the B-axis by a predetermined angle $\theta_B$, for example 10 degrees, as shown in FIG. 19. This allows the reverse marks TS to be dispersed within a region D about the C-axis, as shown in FIG. 20. Accordingly, in the machine tool $100^3$ of FIG. 15, when a workpiece M is machined to form the recess R by rotating the C-axis and inclining the swinging member 130 about the B-axis, the machining program 30 is a machining program for controlling X-, Y- and Z-feed axes so as to move the ball end mil, as the rotating tool T, relative to the workpiece M along a plurality of circular arc curves in the Y-axis direction with pick feeds being applied in the X-axis direction. The reversing position dispersing program 32 is a program for inclining the B-axis by a predetermined angle $\theta_B$ and rotating the C-axis predetermined times. The four feed axes, i.e., the X-, Y-, Z- and C-axes are simultaneously controlled based on the tool path, generated by superimposing the reversing position dispersing program 32 to the machining program 30, including the curved lines in the direction of arrow PD and pick feeds perpendicular to the arrow PD, which are generated under the rotation of the C-axis. When machining a workpiece to form a machined surface such as a lens mold, the reverse marks are dispersed by setting the three orthogonal X-, Y- and Z-axes as the essential feed axes, and setting two rotational feed axes of the C-axis and one of the A- and B-axes as the surplus feed axes, whereby it can be machined by a typical five axis machine tool.

Although the embodiments have been described in relation to the cutting works using a ball end mil as the rotating tool in this embodiment, the present invention can be applied to a grinding work using a grinding wheel, a 3-dimensional planing work using a spring necked non-rotating cutting tool.

REFERENCE SIGNS LIST

10 NC device
12 Reading and Interpreting Section
14 Interpolating Section
16 Servo Controlling Section
20 Tool Path Generating Section
22 Synthesis Program Calculating Section
24 Reversing Position Simulating Section
26 Displaying Section
30 Machining Program
32 Reversing Position Dispersing Program
100 Machine Tool
102 Bed
104 Column
110 Spindle Head
112 Spindle
120 Rotary Table

The invention claimed is:

1. A machining method implemented with a numerical control (NC) device operative with a machining tool on which a rotating spindle is equipped with a servo-motor under the control of the machining program coupled with the NC device to support process of machining a workpiece, by moving the machining tool relative to the workpiece, the machining method including controller-generated tool paths and feed motors associated with the rotating spindle, using essential feed axes which are indispensable to machine the workpiece and at least one surplus feed axis which is not required to machine the workpiece, the method comprising steps of:

generating a plurality of curved tool paths based on the essential feed axes; and machining the workpiece by controlling the at least one surplus feed axis so as to offset reversing positions of feed motors of the essential feed axes along one of the generated tool paths from reversing positions of the feed motors along another of the generated tool paths, so that the reversing positions of the feed motors are dispersed over a machined surface of the workpiece or reversing motions of the feed motors are removed.

2. The machining method according to claim 1, wherein the essential feed axes comprise three orthogonal X-, Y- and Z-linear feed axes, and the surplus feed axis comprises at least one rotational feed axis of A-, B- and C-axes which rotate about axes parallel to the X-, Y- and Z-axes, respectively.

3. The machining method according to claim 2, wherein the movements of the essential feed axes along the tool paths for machining the workpiece and the movement of the surplus feed axis for dispersing the reversing positions of the feed motors in the respective tool paths are superimposed so that the position of the tool paths relative to the workpiece are not changed.

4. The machining method according to claim 2, wherein the surplus feed axis comprises two rotational feed axes of C-axis and one of the A- and B-axes, wherein the workpiece is inclined by rotating the A- or B-axis to a predetermined angular position, and the workpiece is rotated by the C-axis under the inclined condition, and wherein the movements of the essential feed axes and the movement of the surplus feed axis are superimposed so that the position of the tool paths relative to the workpiece are not changed.

5. The machining method according to claim 1, wherein the essential feed axes comprise three orthogonal X-, Y- and Z-linear feed axes, and the surplus feed axis comprises at least one linear l feed axis of U-, V- and W-axes parallel to the X-, Y- and Z-axes, respectively.

6. The machining method according to claim 1, wherein the essential feed axes comprise three orthogonal X-, Y- and Z-linear feed axes, and the surplus feed axis comprises at least one rotational feed axis of A-, B- and C-axes which rotate about axes parallel to the X-, Y- and Z-axes, respectively, and wherein the surplus feed axis includes two motors coaxially disposed and rotate in the opposite directions to each other.

7. A control device for a machine tool for machining a workpiece by moving a tool relative to the workpiece, the control device comprising a computer readable non-transitory storing medium storing therein instructions to carry out the steps of claim 1.

8. The machining method according to claim 1, wherein the steps further comprises calculating the reversing positions of the feed motors on the machined surface for each of the tool paths, and displaying the calculated reversing positions of the feed motors.

9. The machining method according to claim 8, wherein the steps further comprises checking interference between a part of the tool where a cutting edge is not provided and the workpiece.

* * * * *